United States Patent [19]

Nagashima et al.

[11] Patent Number: 4,969,142
[45] Date of Patent: Nov. 6, 1990

[54] REPRODUCTION OF OPTICALLY RECORDED SIGNAL

[75] Inventors: Michiyoshi Nagashima, Hirakata; Yoshinari Takemura, Osaka; Kazuaki Obara, Kadoma, all of Japan

[73] Assignee: Matsushita Electric Industrial Co., Ltd., Kadoma, Japan

[21] Appl. No.: 352,651

[22] Filed: May 12, 1989

Related U.S. Application Data

[63] Continuation of Ser. No. 826,863, Feb. 6, 1986, abandoned.

[30] Foreign Application Priority Data

Feb. 8, 1985 [JP] Japan .................................. 60-23869

[51] Int. Cl.⁵ .............................................. G11B 7/00
[52] U.S. Cl. .................................. 369/109; 369/44.11; 369/112; 250/201.5
[58] Field of Search .................. 369/44, 109, 111, 112; 250/202 DS

[56] References Cited

U.S. PATENT DOCUMENTS 4,349,901 9/1982 Howe .................................. 369/109
4,356,392 10/1982 Wittekoek ............................ 369/44
4,569,038 2/1986 Nagoshima .......................... 369/44

OTHER PUBLICATIONS

"Thermal Changes of Optical Properties Observed in some Suboxide thin films", J. Appl. Phys. 53(12, Dec. 1982, Takeo Ohta et al., pp. 8497-8500.
"TeOx Thin Films for an Optical Disc Memory", J. Appl. Phys. 54(9), Sep. 1983, Mutsuo Takenaga, et al., pp. 5376-5380.

Primary Examiner—Steven L. Stephan
Attorney, Agent, or Firm—Cushman, Darby & Cushman

[57] ABSTRACT

In reproduction of signal recorded on an optical disk by irradiation of laser light beam thereon, interference between reflected diffracted light of +1th order or −1th order and reflected diffracted light of 0th order is coersively induced, and by detecting the interference light, a high frequency signal can be reproduced.

6 Claims, 17 Drawing Sheets

REPRODUCTION OF OPTICALLY RECORDED SIGNAL

This is a continuation of application Ser. No. 06/826,863, filed Feb. 6, 1986, abandoned.

BACKGROUND OF THE INVENTION

1. Field of the Invention

The present invention relates generally to reproduction of an optically recorded signal, and particularly concerned with the reproduction of an optically recorded signal of high frequency.

2. Description of the Related Art

Reproduction of a signal optically recorded on a surface of an optical disk with a thin recording film is accomplished by irradiating a track by a laser beam spot. For recording and reproducing signals of high density the system is as a means for a large capacity and high density data storing system. The recording density, however, is limited by the wavelength of laser used. FIG. 1 schematically shows the surface of an optical disk having U-shaped grooves 1 whereon signals are recorded. In the optical recording disk of FIG. 1 having the U-shaped grooves, in order to sufficiently minimize cross-talk from the neighboring grooves, the pitch between the parallel neighboring grooves (track pitch) has to be more than twice the wavelength of the laser light.

FIG. 2 schematically shows surface of an optical disk having V-shaped grooves 2 on which signals are to be recorded. In the optical recording disk of FIG. 2 having the V-shaped grooves, cross-talk from the neighboring grooves can be minimized even when the pitch between the bottoms of the V-shaped grooves are selected to be just twice the wavelength of the laser light. That is, the V-shaped groove type optical disk is capable of storing higher recording density by decreasing track pitches in comparison with those of U-shaped groove type recording disk (M. Nagashima; Applied Physics Letters, Vol. 42, P. 144, 1983 or U.S. Ser. No. 331,840 or EPC Application No. 81,110,606.1).

As the light source for recording and reproducing information on the optical disk, a semiconductor laser, which is capable of direct modulation and is small in size, is widely utilized. A high power semiconductor laser which can be used for recording the information and has a practically usable life time, for instance as shown in FIG. 3, has an elliptic light emitting facet 3 and sections of the emitted light beam 4 are also of elliptic shape. The wavelength of oscillated light is about 0.8 $\mu$m and the power of emitted light is around 25 mW. In order to focus a circular spot on a surface of the optical disk, it is necessary to obtain a laser beam of substantially circular section by enlarging shorter diameter L of the section 4 of the laser beam.

FIG. 4 shows an optical system of the general configuration of an apparatus for recording and reproducing information signal on a disk. In the system, a light beam emitter part 57 has a semiconductor laser 5 to emit a coherent light, a collimate lens 6 for making the light from the semiconductor laser 5 a parallel light beam and a beam expander 7 which expands and reforms the collimated beam of the elliptic section to a beam of parallel light of substantially circular section. The laser beam X from the light beam emitter part 57 is then led to a polarized beam splitter 8, a quarter wave plate 9, and focussed by an objective lens 10 onto a recorded surface 11 of an optical disk. Light reflected from the recorded surface 11 is guided again through the objective lens 10, the quarter wave plate 9 and the polarized beam splitter 8, and then led through a convex lens 12, from which one part of the reflected light is further reflected by a mirror 13 to irradiate a photo-detector K for focussing control. The other part of the light from the convex lens 12 is led to another photo-detector M, and the signals detected by the photo-detectors M are used for reproducing the information and controlling tracking.

Shapes of the beam of the reflected light and the light receiving face of the photo-detector M for the system of U-shaped groove optical disk and for the system of V-shaped groove optical disk are shown in FIG. 5 and FIG. 6, respectively. Tracking of the light beam along the U-shaped grooves is made by adjusting the light intensity of the beam 16 received by light detection parts 14 and 15 to become equal each other, and by utilizing signals based on sum of the light intensity on the light detector parts 14 and 15, the signal is reproduced.

In case of the V-shaped groove type optical disk, the tracking control is made by slightly wobbling the V-shaped grooves to produce wobble containing output from the light detection parts 17 and 18 followed by extracting signals of the wobbling frequency therefrom (U.S. Ser. No. 525,412 and EPC Application No. 83,304,832.5).

In the optical signal recording system mentioned above, since beam forming by the beam expander 7 in FIG. 4 is necessary, light power transmission efficiency of the optical system is at largest only 40%; accordingly, even by using a high power semiconductor laser emitting light of 25 mW, actual light power received on the optical disk becomes only 10 mW. One example is described for a case of reproducing optically recorded signal by using a semiconductor laser which oscillates a light of the wavelength 0.83 $\mu$m for a recording material of TeO$_x$ (T. Ohta, et al.; Journal of Applied Physics, Vol. 53, P. 8497, 1982 or M. Takenaga, et al.; Journal of Applied Physics, Vol. 54, P. 5376, 1983). In the example, for the optical disk of U-shaped grooves an objective lens of numerical aperture (NA) of 0.5 is used, and for the optical disk of V-shaped grooves an objective lens of numerical aperture (NA) of 0.6 is used in a manner that the laser beam is incident only to a central part of the lens corresponding to NA 0.5. The optical disk is rotated at 1800 rpm and the recording is made at a track having 75 mm radius (track linear velocity is 14 m/sec). By selecting recording power to be 8 mW and reproducing power to be 1 mW on the disk, a signal of 10 MHz (recording bit length is 0.7 $\mu$m) is obtainable with C/N ratio of about 50 dB (with band width of 30 KHz). However, in order to handle high quality information (for instance, MUSE system of high quality TV signal proposed by NHK, Japan), a higher frequency signal must be recorded and reproduced.

The V-shaped groove type optical disk can enjoy about twice higher recording density in comparison with the U-shaped groove type by halving track pitch, but bit densities are the same in both systems and the quality of the information to be recorded has no difference. In order to elucidate behavior of reflected light from the optical disk, description is made hereafter how the bit density is limited by the laser light wavelength or NA of the objective lens.

As shown in FIG. 7, an orthogonal coordinate system (x-y) is provided on an entrance pupil of objective lens 10 for converging laser light on the disk surface, and the light wave distribution of the incident laser beam is represented by A(x,y). Another orthogonal coordinate system ($\xi - \eta$) is provided on the recording surface 11 of the optical disk. $\xi$ axis and $\eta$ axis are parallel with x axis and y axis, respectively, and the $\xi$ axis is set in radial direction of the optical disk, and $\eta$ axis is set in the tangential direction of the track of the optical disk. Complex reflectivity which gives effects on the reflected light wave of the laser spot is represented as R($\xi$, $\eta$). When it is provided that the recording face 11 of the optical disk has a periodic structure and its length of repetition in $\xi$ direction is p and that in $\eta$ axis direction is q, the complex reflectivity R($\xi$, $\eta$) can be represented by Fourier series expansion as follows:

$$R(\xi,\eta) = \sum_l \sum_m R_{lm} \exp\left\{ 2\pi i \left( \frac{l}{p} \xi + \frac{m}{q} \eta \right) \right\}. \tag{1}$$

Further, on an exit pupil of the objective lens whereto the reflected light from the optical disk is incident, another orthogonal coordinate (u-v) is set. Axis u and axis v are made to agree with the x axis and the y axis. The reflected light wave distribution E(u, v) can be represented by the following equation:

$$E(u,v) = \sum_l \sum_m E_{lm}(u,v) \tag{2}$$

$$E_{lm}(u,v) = R_{lm} A\left( -u + \frac{\lambda l}{p} f, -v + \frac{\lambda m}{q} f \right).$$

The equation (2) represents the following reflected light from the optical disk consists of many diffracted lights $E_{lm}$, and each of the diffracted lights has a similarity with the incident light A(x, y), and amplitude and phase of the light wave is determined by Fourier series coefficient $R_{lm}$. Further, centers of respective diffracted light are disposed apart from each other by $\lambda l f/p$ in u axis direction and by $\lambda m f/q$ in v axis direction, wherein f is a focal length of the objective lens 10. These diffracted lights together, by superposing, namely interfering, form the reflected light wave E(u, v). Light intensity I(u, v) is the square of the absolute value of the light wave amplitude, and the reflected light intensity distribution I(u, v) is given as follows:

$$I(u,v) = E(u,v)^2 \tag{3}.$$

The recording list density is taken into consideration only along the track direction, and therefore the complex reflectivity distribution R($\xi$, $\eta$) can be considered in $\eta$ direction only in one dimensional way. Therefore, for simplicity, it is assumed that the distribution of the complex reflectivity distribution is uniform in $\xi$ direction. Accordingly, the equations (1) and (2) are represented in the following equations (4) and (5), respectively:

$$R(\eta) = \sum_m R_m \exp\left\{ 2\pi i \frac{m}{q} \eta \right\} \tag{4}$$

$$E(u,v) = \sum_m E_m(u,v) \tag{5}$$

$$E_m(u,v) = R_m A\left( -u, -u + \frac{\pi m}{q} f \right).$$

Next, the case of FIG. 8 wherein recorded parts of reflectivity $r_2$ each having length of $\frac{1}{2}q$ and unrecorded parts of reflectivity $r_1$ each having length of $\frac{1}{2}q$ are disposed alternately with repetition length (i.e. spatial period) q. In this case, the complex reflectivity distribution R($\eta$) is represented as follows:

$$R(\eta) \begin{cases} r_1 \ (-\frac{1}{2}q \leq \eta < -\frac{1}{4}q) \\ r_2 \ (-\frac{1}{4}q \leq \eta \leq \frac{1}{4}q) \\ r_1 \ (\frac{1}{4}q < \eta \leq \frac{1}{2}q) \end{cases}. \tag{6}$$

Fourier series coefficients $R_m$ for the equation (6) is given as follows:

$$R_m = r_1 \text{Sinc}(\pi m) + \frac{r_2 - r_1}{2} \text{Sinc}\left( \frac{\pi m}{2} \right), \tag{7}$$

wherein the function Sinc(x) represents sin (x)/x. In case the optical disk moves by a distant of Vt (V is speed, t is time) in $+\eta$ direction, the complex reflectivity distribution, taking account of time change of FIG. 9, is represented as follows:

$$\widetilde{R}(\eta) = \sum_m \widetilde{R}_m \exp\left\{ 2\pi i \frac{m}{q} \eta \right\} = R(\eta - Vt). \tag{8}$$

From the equations (4) and (8), the time-changing Fouries series coefficients are given as follows:

$$\widetilde{R}_m = R_m \exp\left( -2\pi i \frac{m}{q} Vt \right). \tag{9}$$

The conventional reproducing methods of FIG. 5 and FIG. 6 only receive reflected light intensities of specified regions. Such conventional method has a drawback that its bit density is not sufficient due to the below-mentioned reason.

The relation between the bit density and the reproduced signal is elucidated in detail in the following.

Firstly, the elucidation is made on the reproducing system for the optical disk having U-shaped grooves shown in FIG. 1.

Presumption is made that diameters of entrance pupil and exit pupil of the objective lens 10 of FIG. 7 are equal to the focal length f (namely NA=0.5), and that the incident light wholly enters the objective lens 10. Apart from FIG. 5 wherein the reflected light beam is semi-circular shape, here the section of the reflected light beam is presumed circular. FIG. 10 shows the diffracted lights $E_{-1}$ (having center at 0), $E_{+1}$ (having center at $0_{+1}$) and $E_{-1}$ (having center at $0_{-1}$). Consideration is made by limiting only to the case wherein repetition length q of FIG. 8 and FIG. 9 are smaller than $2\lambda$ ($\lambda$ is laser light wavelength). In the case of FIG. 10, the distance between the center 0 and center $0_{+1}$ and another distance between center 0 and center $0_{-1}$ are both larger than $\frac{1}{2}f$. Each diffracted light has similarity with the incident light, and therefore, radii of respective diffracted lights are $\frac{1}{2}$f. The circle $E_0$ of FIG. 10 has the same size as the exit pupil, and within a region B therein the diffraction lights $E_0$ and $E_{+1}$ interfere with each other; within a region C the diffracted lights $E_0$ and $E_{-1}$ interfere with each other. Furthermore, within a region A, only the diffracted light $E_0$ exists. For the simplicity, let us presume that incident light wave distribution is uniform and is $A_0$, the light waves $E_B$ and $E_C$ within the regions B and C are represented as follows from the equations (5), (7) and (9):

$$E_B = \left\{ \frac{r_1 + r_2}{2} + \frac{r_2 - r_1}{\pi} \exp\left(-2\pi i \frac{Vt}{q}\right) \right\} A_0 \quad (10)$$

$$E_C = \left\{ \frac{r_1 + r_2}{2} + \frac{r_2 - r_1}{\pi} \exp\left(2\pi i \frac{Vt}{q}\right) \right\} A_0.$$

Time changing component $I_B(t)$ and $I_C(t)$ of light intensities of these light waves $E_B$ and $E_C$, respectively, are given as follows, since in a $TeO_x$ recording medium the reflectivity $r_1$ and $r_2$ can be considered as real numbers:

$$I_B(t) = I_C(t) = \left\{ \frac{r_2^2 - r_1^2}{\pi} \cos\left(2\pi \frac{Vt}{q}\right) \right\} |A_0|^2. \quad (11)$$

In the diagram of FIG. 10, the light in the region A has no components that change with time. The area of the regions B and C of FIG. 10 is given by $$a = \frac{1}{2}f^2 \left[ \cos^{-1}\left(\frac{\lambda}{q}\right) - \frac{1}{2}\sin\left(2\cos^{-1}\left(\frac{\lambda}{q}\right)\right) \right], \quad (12)$$

and signal S(t) corresponding to the sum of the regions B and C is given as follows:

$$S(t) = \frac{2}{\pi} a(\Delta R) |A_0|^2 \cos\left(2\pi \frac{Vt}{q}\right), \quad (13)$$

wherein $\Delta R = r_2^2 - r_1^2$. FIG. 11 is a diagram showing change of the reproduced signal amplitude with respect to repetition length q.

Apart from the above-mentioned recording medium of $TeO_x$, for general recording materials, the reflectivities $r_1$ and $r_2$ may be complex numbers, and even for such case the similar relation holds.

The reproduction of the signal is made by each other interference of the reflected diffracted light of 0th order $E_0$ with reflected diffracted light of +1th order $E_{+1}$ or −1th order $E_{-1}$, and when the interferences are not made ($q<\lambda$; that is, the regions B and C in FIG. 10 disappear), the reproduced light is not time-changing, i.e., constant with respect to time. When a recording medium of $TeO_x$ is used and laser light of wavelength 0.83 μm is used, a signal of recording bit length of 0.7 μm (namely, q=1.4 μm) as above-mentioned is sufficiently usable for reproduction with C/N ratio of 50 dB. At this time, the amplitude of the reproduced signal is calculated from the equations (12) and (13) to be 0.186 ($\Delta R)I_0$, by providing the incident light intensity $I_0$ as $$I_0 = \pi \left(\frac{f}{2}\right)^2 |A_0|^2.$$

Next, elucidation is made on reproduction of V-shaped groove type optical disk shown in FIG. 2 in brief. For the objective lens 10 of FIG. 7, a lens wherein diameters of entrance pupil and exit pupil are 1.2 times of the focal length f (namely, NA=0.6) is used, and the incident light beam 20 has an elliptic cross-section as shown in FIG. 12, wherein shorter diameter of the ellipse in the radial direction of the disk (in x axis direction) is selected to be equal to the focal length f. In the reproduction of signal on the V-shaped groove type optical disk, it is necessary to effectively utilize diffracted lights shifted in the radial direction of the disk (directions of the axes x, ξ and u) (as disclosed in U.S. Ser. No. 331,840 and EPC Application No. 81,110,606.1. Therefore the one dimensional consideration made with reference to FIG. 8, FIG. 9 and FIG. 10 is not sufficient, but it is necessary to make calculation by means of the functions having two suffixes l and m as shown in the equations (1) and (2). Accordingly, at the exit pupil surface the case of two dimensionally expanding diffracted light as in FIG. 13 is considered. But the fundamental principle of using the interference of the diffracted lights in reproducing the signal is the same as the aforementioned elucidation with respect to the U-shaped groove optical disk. In the case of this V-shaped groove optical disk, the signal reproduction is made by making interferences on the exit pupil of the objective lens in a region outside a vertical straight line g, in a manner that diffracted lights $E_{00}$ or $E_{10}$ having the center on the U axis interfere with upward shifted diffracted lights $E_{01}$ or $E_{11}$ centers of which has shifted in v axis direction, within the region of the former diffracted light ($E_{00}$ or $E_{10}$). In the elucidation for FIG. 13, for simplicity, diffracted lights of l=−1 and m=−1 are omitted. There is a problem that for bit densities higher than a certain degree, the interference is not obtainable, hence making the reproduction of the signal impossible and this problem arises in V-shaped groove type optical disks quite similarly to the aforementioned case of the U-shaped groove type optical disk.

In order to handle a higher frequency signal with the same limited bit density, rotation speed of the optical disk must be increased. That is, by raising the track linear velocity, the frequency limit of the signal reproduction becomes higher for the same recording bit length. However, there occurs another problem that the recording material has an inherent limit of sensitivity of recording, and therefore, when the track linear velocity is increased, a considerably higher power of laser becomes necessary in order to carry out the recording with such high track linear velocity. Since the semiconductor laser has limited power, as aforementioned, transmission efficiency of the optical system must be made higher in order to raise the laser power on the optical disk. Therefore, magnifying factor of the incident laser beam must be decreased. FIG. 14 shows the situation of the entrance pupil of the objective lens at that time, wherein the elliptic line 21 designating the incident beam is drawn to designate the part having 1/e light intensity of that of the light axis. However, the laser spot 22 focussed on the optical disk becomes an ellipse which is longer in the track direction (η axis direction) as shown in FIG. 15, and hence the bit density of the recording becomes low. Therefore, the above-mentioned measure can not attain an expected result intended by increasing the track linear velocity thereby failing to reproduce the high frequency signal.

Next, the above-mentioned matter is elucidated from view point of the operated of diffraction lights impinging on the exit pupil of the objective lens 10.

In FIG. 14, the incident light beam of elliptic section has its shorter diameter which is 0.5 times the focal length f of the objective lens, and for the simplicity it is provided that it has a uniform light intensity distribution $|A_1|^2$ within the elliptic area 21. At this time, the optical light transmission efficiency becomes about 60%, and by presuming that the lasing power of the semiconductor laser to be 25 mW, a light power at maximum of 15 mW can be collected on the disk. Then, by using the $TeO_x$ as recording material, by rotating an optical disk of a diameter of 20 cm at a speed of 3600 rpm, recording can be sufficiently made. On the exit pupil of the objective lens 10, as aforementioned the diffracted light has the expansion of the similar figure to the incident light. By handling the matter in one dimensional manner, similar to that of FIG. 10, wherein recorded bit length is 0.7 μm (q=1.4 μm) and laser wavelength is 0.83 μm, the situation of the diffracted light becomes as shown in FIG. 16. Here, the distance between the centers of neighboring diffraction lights are about 0.6 f, and the interference region disappears, and the reproduced signal loses any time changing factor. Therefore, the above considerations prove that at a track of radius of 75 mm with a rotation speed of 3600 rpm, the highest frequency reproduceable signal is only 10 MHz. That is, even by improving the transfer efficiency and by increasing the rotation speed, the bit density is lowered, and it becomes impossible to reproduce signals of high frequency.

Summarizing the above, in the conventional art, as the recorded bit length is shortened, the centers of the diffracted light on the exit pupil of the objective lens depart more and more as shown in FIG. 10, FIG. 13 or FIG. 16, resulting in failure of interference between the diffracted lights, and disabling reproduction of high frequency signal.

OBJECT AND SUMMARY OF THE INVENTION

The purpose of the present invention is to provide an improved method for reproduction of optically recorded signal which method is capable of reproducing a higher frequency signal.

According to the present invention, by using means for coersively interfering reflected diffracted light of +1st order or −1st order and a reflected diffracted light of 0th order from the surface of the optical disk on which the signal is optically recorded, and the light after the interference is detected by photo-electronic means.

By utilizing the above-mentioned method of the present invention, a signal of high frequency can be reproduced and a high quality signal can be handled.

BRIEF DESCRIPTION OF THE DRAWING

These and other advantages of the present invention may be appreciated from studying the following detailed description of the presently preferred exemplary embodiment together with the drawings in which.

DESCRIPTION OF PREFERRED EMBODIMENTS

Embodiment 1

Figure 4:
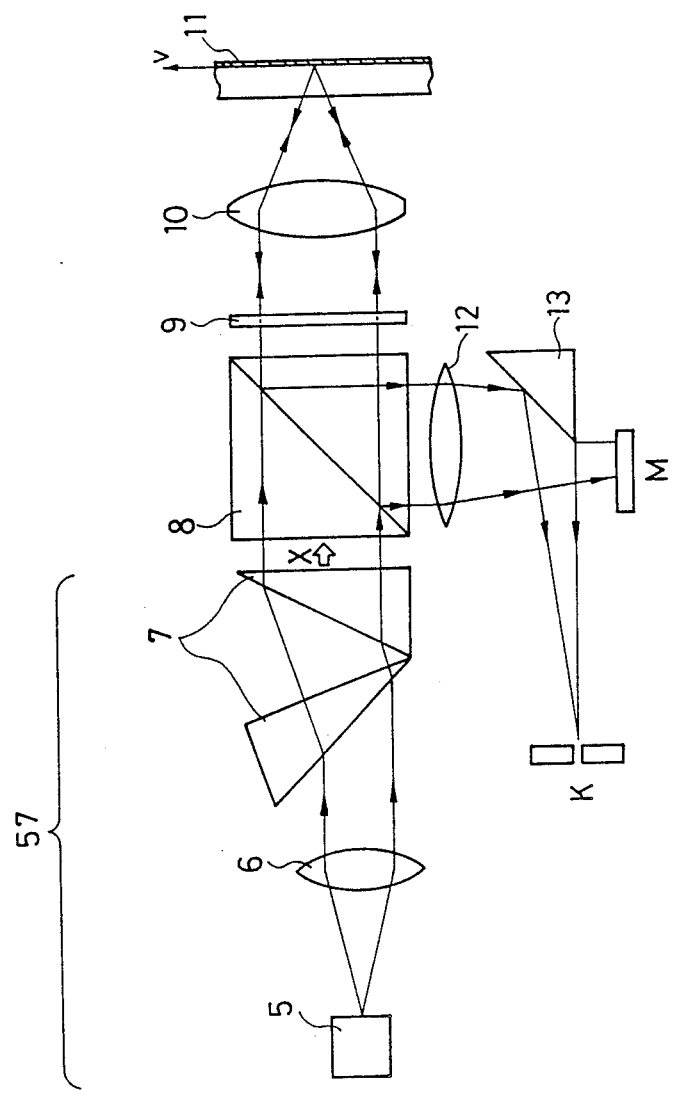
FIG. 4 is the schematic sectional view showing configuration of the optical system of the general apparatus for reproduction of optically recorded signal.
Figure 17:
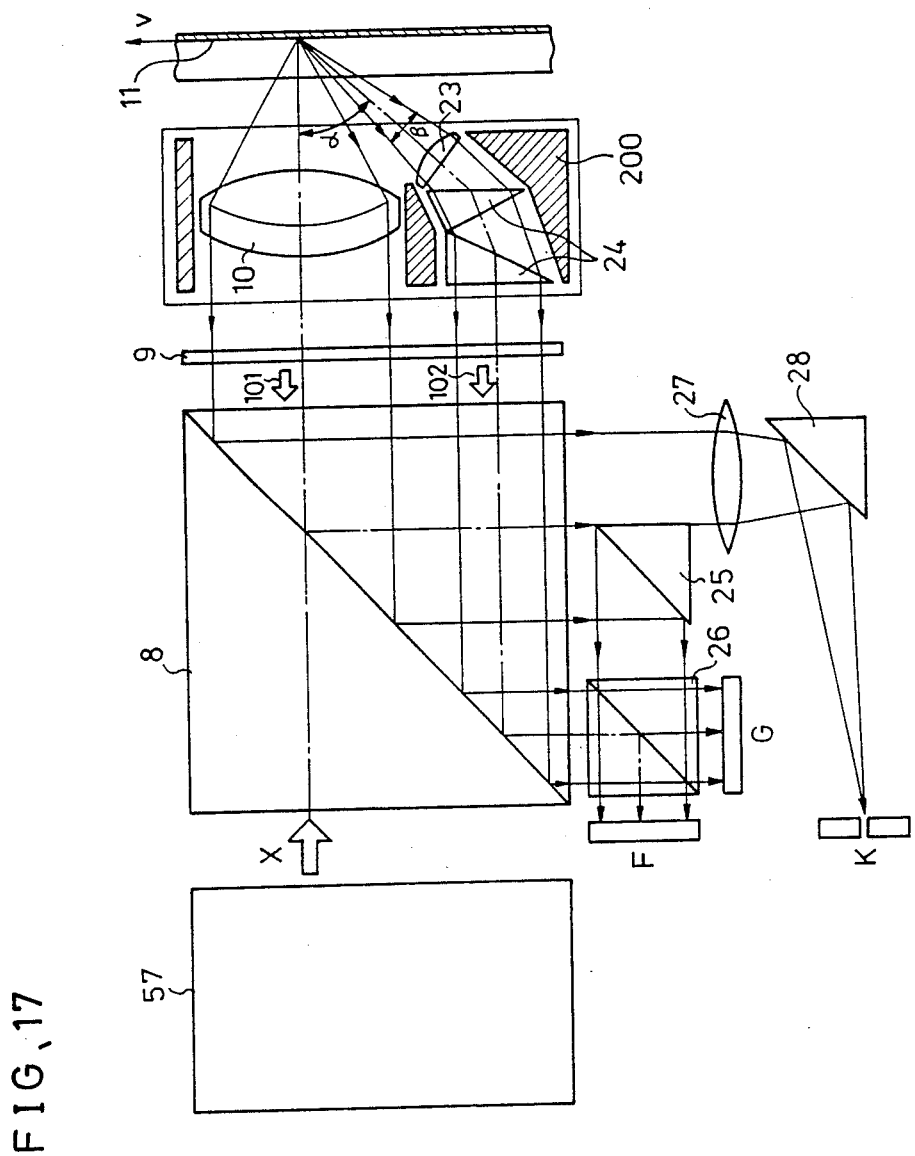
FIG. 17 is a sectional view illustrating configuration of a first embodiment of optical system of signal reproducing apparatus in accordance with the present invention.
Figure 18:
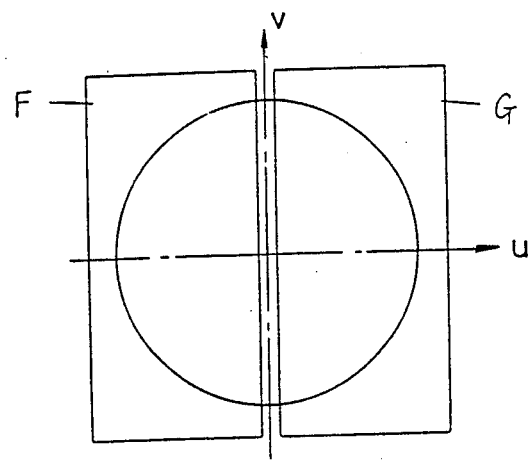
FIG. 18 is a front view illustrating photo-detectors for signal reproduction from a U-shaped groove type optical disk in accordance with the first embodiment.
Figure 19:
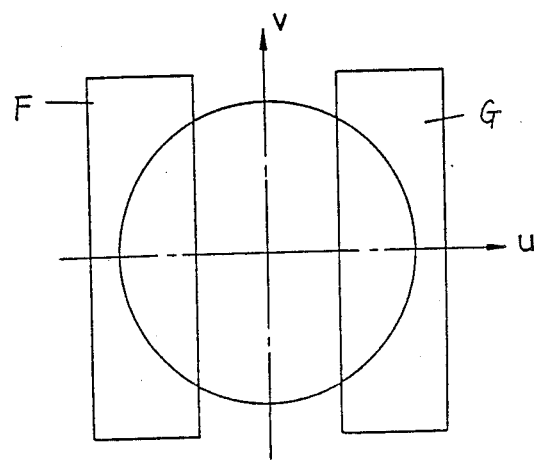
FIG. 19 is a front view illustrating photo-detectors for signal reproduction from a V-shaped groove type optical disk in accordance with the first embodiment.

A signal reproduction apparatus of a first embodiment of the present invention is shown in FIG. 17. In the apparatus of FIG. 17, a coherent laser light beam X generated by the laser light beam generator 57 shown in FIG. 4 enters from left side. The configuration of the laser beam generator 57 is the same or similar as that shown in FIG. 4, and therefore detailed description thereon is omitted. The laser light beam X shown by a white arrow passes a known polarized beam splitter 8, a known quarter wave plate 9 and an objective lens 10, and is focussed on a signal recorded surface 11 of an optical recording disk from which travels in a direction v. Light reflected by the recorded surface 11 passes through the objective lens 10 and plate 9, and is reflected by the polarized beam splitter 8 and incident to a mirror 25 and a converging lens 27. Another part of reflected light from the recorded surface 11 is collected by a collimator lens 23 and then passes through prisms 24 so as to be made a parallel light beam 102 which is also coherent with the main reflected light beam 101 from the objective lens, and after passing through the quarter wave plate 9, the parallel light beam 102 is reflected by a part of the beam splitter 8, and incident to a half mirror 26. By the half mirror 26, the light which passes through the objective lens 10, and the mirror 25 is made to interfere with the light which passes through the convex lens 23, the prism 24 and the beam splitter 8, thereby making interference light which is detected by a photo-detector F and G. Another part of the returning light 101 which passes through the objective lens 10, the quarter wavelength plate 9 and the beam splitter 8 is converged by a convex lens 27 and reflected by a mirror 28, and the light is focussed on a photo-detector K, so as to be used for automatic focussing control in accordance with known art. The photo-detectors F and G are configured in the same shape and size. The shape and disposition of the photo-detectors F and G with respect to the light beam incident thereon is shown in FIG. 18 which is for the case of a U-shaped groove type optical disk and FIG. 19 which is for a V-shaped groove type optical disk. Control of the tracking is made in the same manner as elucidated in reference to FIGS. 5 and 6. By the way, it is recommended that the objective lens 10, the convex lens 23 and prisms 24 are encapsulated in an integral casing 200 for easy tracking and focussing controlling.

Now, a description is made on how the direction of the diffracted lights are represented. Direction of 1st diffracted light fulfills a relation of the following equation for a spacial period q on the recording surface 11 and a wavelength λ of the laser:

$$\sin\theta = \frac{\lambda}{q}. \tag{14}$$

Figure 20:
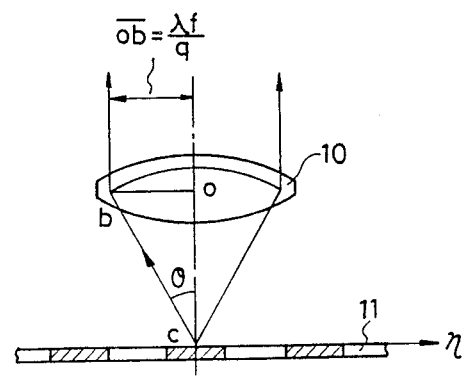
FIG. 20 is a sectional view illustrating direction of diffracted light.

As shown in FIG. 20, the objective lens 10 makes parallel coherent light from the incident diffracted light, distance $\overline{Ob}$ from the optical axis is given as follows:

$$\overline{Ob} = f \sin\theta (\overline{bc} = f) \tag{15}$$

As has been described with reference to equation (2), the distance of the first diffracted light on the exit pupil from the optical axis is λf/q.

Figure 21:
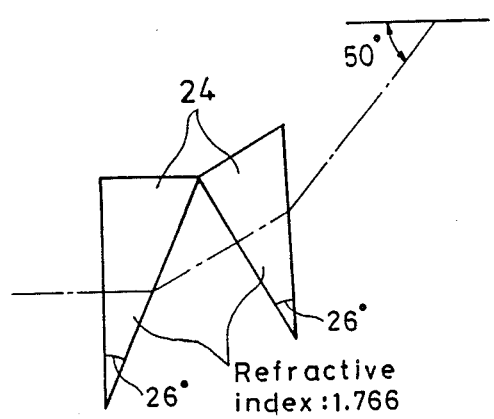
FIG. 21 is a sectional view of prisms 24 in the first embodiment.
Figure 22:
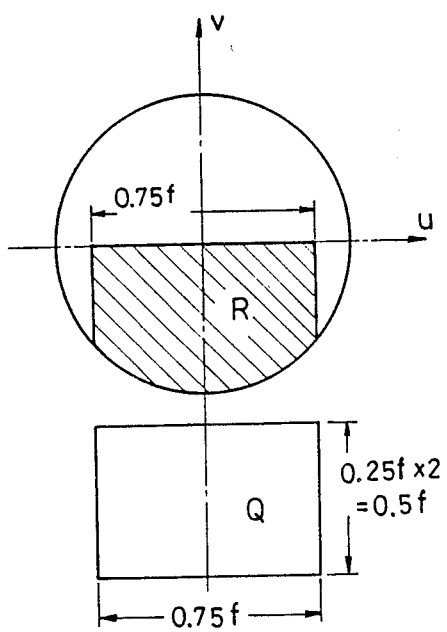
FIG. 22 is a front view illustrating interference region of the first embodiment.

Now, consideration is made on a first example wherein the optical disk has U-shaped grooves so that the bit density can be improved. The lens 23 has almost a similar focal length as the focal length f of the objective lens, and collect diffracted lights in a rectangle region defined by a length about 0.75 f in radial direction of the disk and about 0.25 f (i.e., β=15°) in tangential direction of the track, respectively of the recorded surface 11 of the optical disk. The prisms 24 are configurated as shown in FIG. 21, wherein the size in the radial direction of the optical disk is also selected 0.75 f. After coming out of the two prisms, the size, of the reflected light beam in transiential direction (v) of the track is enlarged 2 times as shown in FIG. 22 thereby to become 0.5 f. By selecting the angle α to be α=50° in the apparatus of FIG. 17, from the equation (14), it is understood that the center of the 1st diffracted light is incident on the lens 23 even when the recorded bit length is 0.65 times (q=1.3λ) of the wavelength of the laser light.

FIG. 22 shows exit pupil of the objective lens. Reflected light of the region Q is collected by the lens 23 and enlarged by the prisms 24 and induced to interfere on the half mirror 26 with the reflected light from the region R of the objective lens 10 of FIG. 22. The area of the interference region R is 0.33 f².

Now, for the simplicity let us presume that the incident light is uniformly distributed (to have a constant light wave $A_0$), reflected light in the region Q has a reflected light wave amplitude which is 0.71 times (i.e., $\sqrt{\frac{1}{2}}$) the original one since the beam size is enlarged 2 times, and that the diffracted light wave in the region Q is also uniform and 0.71 $A_0$. Then, the light wave $E_{QR}$ after interference on the half mirror 26 and light intensity $I_{QR}$ are represented as follows:

$$E_{QR} = \left\{ \frac{r_1 + r_2}{2} + 0.71 \frac{r_2 - r_1}{\pi} \exp\left(-2\pi i \frac{Vt}{q}\right) \right\} A_0 \tag{16}$$

-continued $$I_{QR} = \left\{ \frac{0.71}{\pi} (\Delta R)\cos\left(2\pi \frac{Vt}{q}\right) \right\} |A_0|^2, \quad (17)$$

Figure 23:
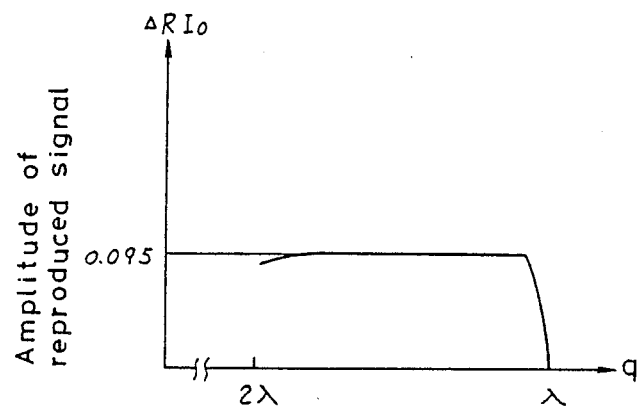
FIG. 23 is a graph showing frequency characteristic of amplitude of reproduced signal obtained by induced interference in the first embodiment.

Since the area of the region R is 0.33 f², the signal amplitude in the light intensity is 0.095 (ΔR)I₀. The 1st diffracted light is collected by the lens 23, and has the circular expansion with the diameter f in the entrance pupil of the lens 23. The longer side of the collected area is 0.75 f in the radial direction of the optical disk, the shorter side is 0.25 f and the center of this area is at the angle of α=50° as shown in FIG. 17. When the shape of the region R is considered, the 1st diffracted lights interfere with 0th diffracted light in all area of the region R when angle α of direction of the diffracted light is from 33° to 62°. Such range of angle α corresponds to a range of bit length of the recorded signal from 0.56λ to 0.91λ. Outside the above-mentioned range, the 0th diffracted light in the region R has a portion which does not interfere with the 1st diffracted light. FIG. 23 shows the frequency characteristic of the amplitude of the reproduced signal obtained by interference between the region R and region Q.

Figure 5:
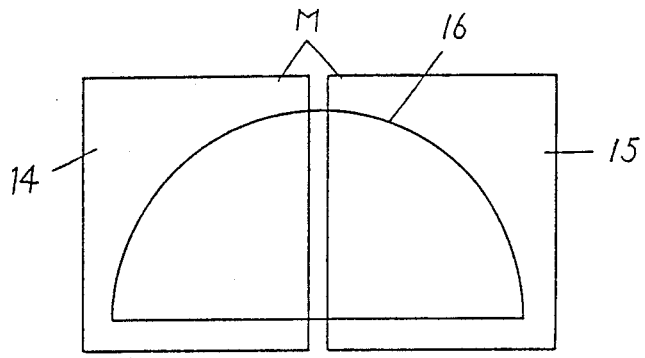
FIG. 5 is the schematic front view showing the disposition of the photo-detectors for signal reproduction from the U-shaped groove type optical disk.
Figure 6:
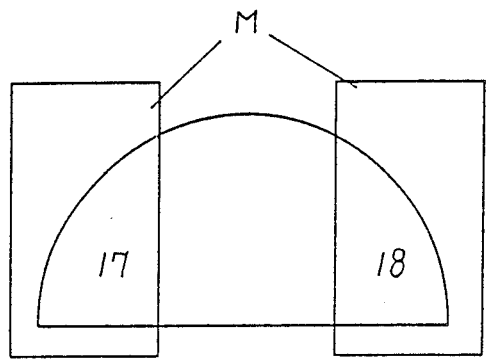
FIG. 6 is the schematic front view showing disposition of the photo-detectors for signal reproduction from the V-shaped groove type optical disk.
Figure 7:
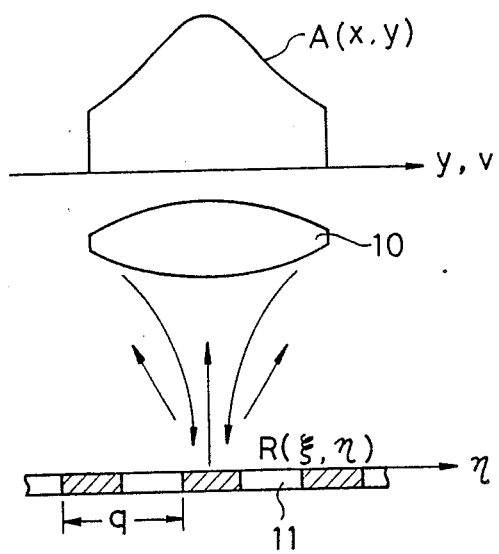
FIG. 7 is the diagram for illustrating principle of signal reproduction from the optical disk.
Figure 8:
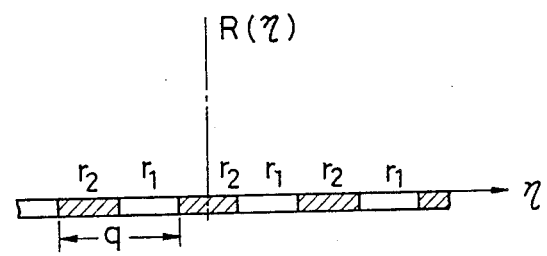
FIG. 8 and FIG. 9 are the schematic sectional views for illustrating complex reflectivity distribution of the recorded surface.
Figure 9:
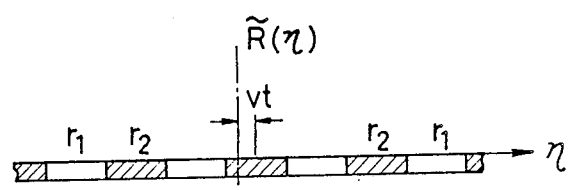
Figure 10:
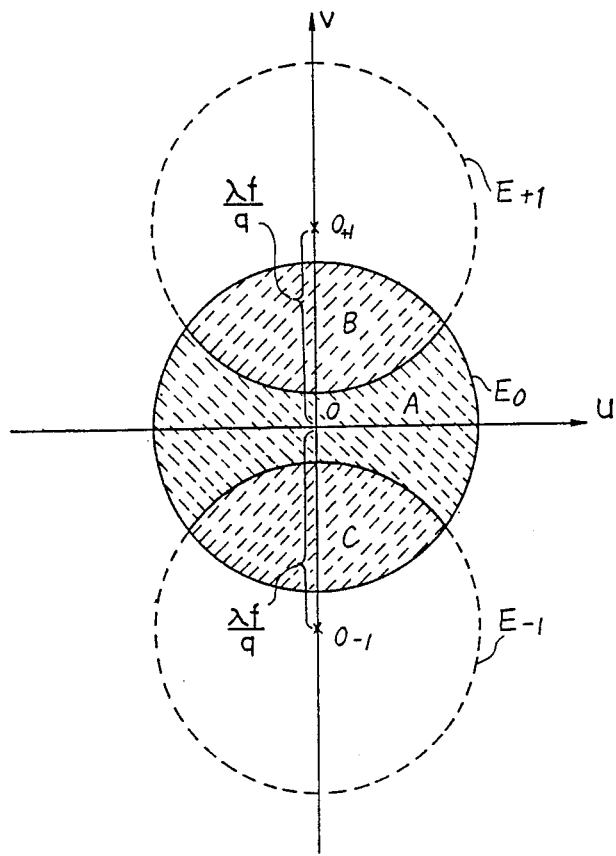
FIG. 10 is the diagram illustrating disposition of diffracted light on the exit pupil of the objective lens of the conventional apparatus.
Figure 11:
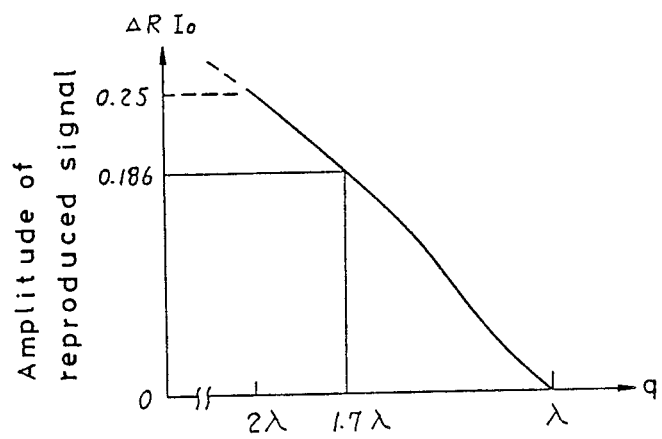
FIG. 11 is the frequency characteristic graph of the amplitude of reproduced signal of the conventional apparatus.
Figure 12:
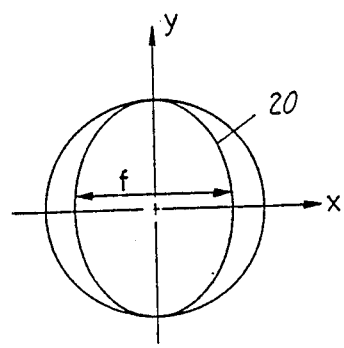
FIG. 12 is the schematic front view illustrating shape of incident light beam for V-shaped groove type optical disk.
Figure 13:
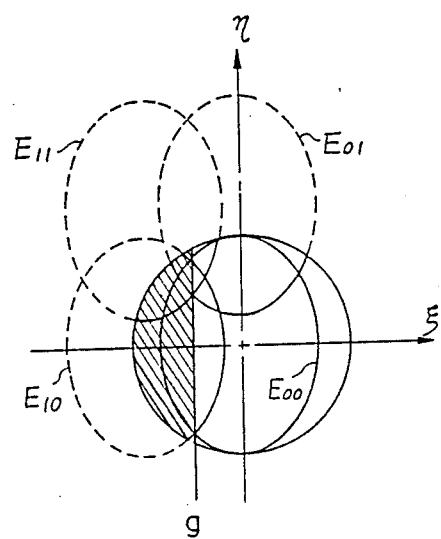
FIG. 13 is the front view illustrating disposition of the diffracted light on the exit pupil of the objective lens at signal reproduction of the V-shaped groove type optical disk.
Figure 24:
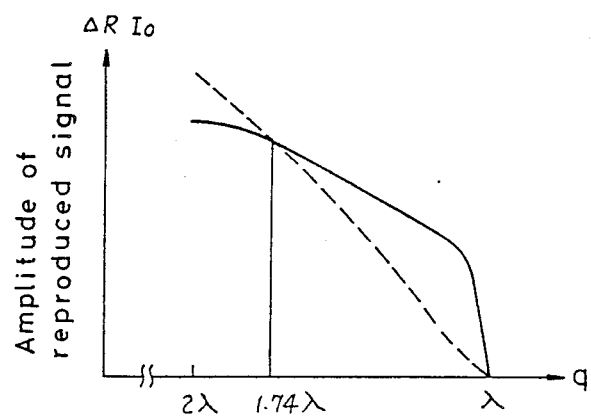
FIG. 24 is a graph showing frequency characteristic of amplitude of reproduced signal obtained in the first embodiment.

In the first embodiment of FIG. 17, with respect to the light in the positive region of the v axis of the exit pupil, the light in the region B of FIG. 10 has been detected by a photo-detector K, by using the conventional method same as that of FIG. 5. With respect to the light in the negative region of the v-axis, the light detection is made by using the light interference between the diffracted lights of the region R and region Q elucidated in FIG. 22. Accordingly, sum of the half amplitude of the signals of FIG. 11 and the amplitude of FIG. 23 becomes the amplitude of reproduced signal of the apparatus of FIG. 17, and the resultant amplitude is shown by a solid curve in FIG. 24, wherein dotted curve shows amplitude of the conventional system of FIG. 11.

In the above-mentioned first embodiment, though for the recording bit length of over 0.87λ, the reproduced signal is slightly smaller than that of the conventional one, for the bit length of less than 0.87λ, the signal amplitude has sufficient magnitude and the frequency characteristic is much improved than the conventional one.

Figure 25:
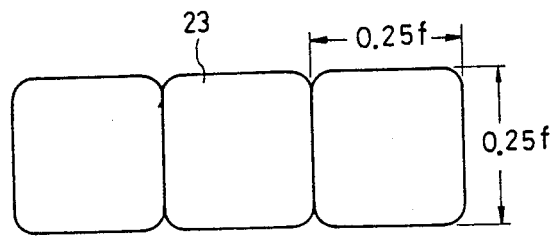
FIG. 25 is a front view showing another embodiment of lenses for collecting diffracted lights coming on paths which do not pass the objective lens 10 in the apparatus of FIG. 17.

The lenses 23 of FIG. 17 is for receiving reflected light for 0.25 f-width in the tangential direction (V), and it corresponds to NA 0.125. For such value of NA a single lens constitution can be used without any problem of abberation. However, the apparatus of FIG. 17 has a problem that reflected light must be received for the width of 0.75 f in the radial direction of the optical disk, and this corresponds to NA 0.375, which has a liability of producing an aberration. Therefore, as shown in FIG. 25, by disposing three substantially square lenses having about 0.25 f for both sides in a row as the lens 23, the aberration can be neglected.

Quite similarly to the above-mentioned description of signal reproduction system on the optical disk of U-shaped groove type, an achievement of high bit density recording and reproducing for the signal reproduction system of the V-shaped groove type can be made in the same way.

Embodiment 2

Figure 26:
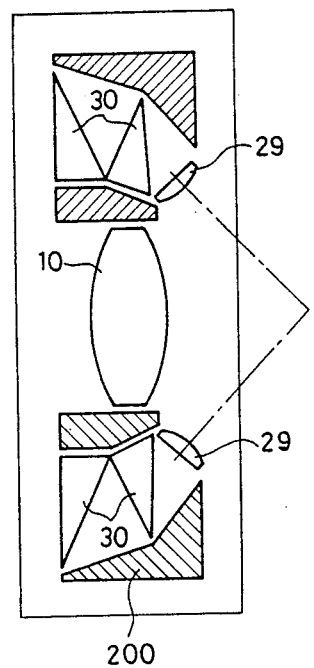
FIG. 26 is a sectional view showing diffracted light guiding means of a second example.
Figure 27:
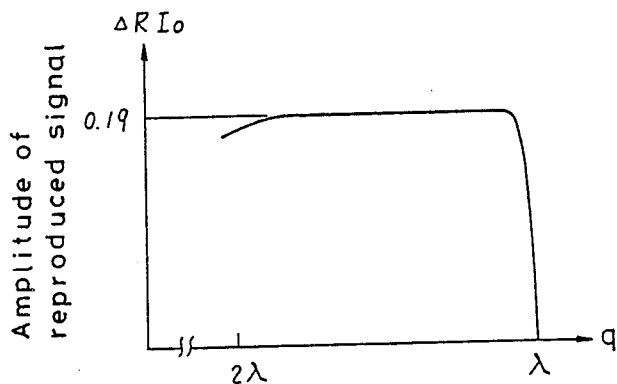
FIG. 27 is a graph showing frequency characteristic of the amplitude of the reproduced signal of the second embodiment.

FIG. 26 shows a modified embodiment of the objective lens 10 and prisms 30, 30 disposed around the objective lens as a modified example to be used in place of the adjustable optical lens unit 200 shown in FIG. 17. The prisms 30, 30 disposed on both sides in tangential direction of the track of the objective lens 10 are for guiding the reflected diffracted lights from the signal recorded surface to the beam splitter 8 of the apparatus of FIG. 17 and subsequent optical components therein. The prisms 30, 30 are to guide the diffracted lights in both positive side and negative side with respect to v axis at the exit pupil of the objective lens, similarly to the 1st embodiment. Accordingly, the amplitude of the reproduced signal becomes 2 times of the value shown in the characteristic diagram of FIG. 23. The obtained frequency characteristic is shown in FIG. 27.

In the embodiment using the objective lens unit of FIG. 26, its tracking controlling can be made by using interference light obtained by the half mirror 26 similarly to the case of FIG. 17. On the other hand, the focus adjustment can be made by interfering reflected diffracted light in a positive side of the v axis direction at the exit pupil of the objective lens 10 on the half mirror 26, similarly to the case of FIG. 17, and subsequently, after converging the interference light, by detecting it by two divided photo-detectors K, similar to the case of FIG. 17.

According to the embodiment of FIG. 26, optically recorded signal can be sufficiently reproduced up to such small bit length of 0.55. That is, by using a semiconductor laser having wavelength of 0.83 m, and by rotating the optical disk at 1800 rpm with a radial position of 75 mm for the recorded signal, such a high frequency signal as 15.5 MHz can be reproduced with good quality.

Embodiment 3

Figure 28:
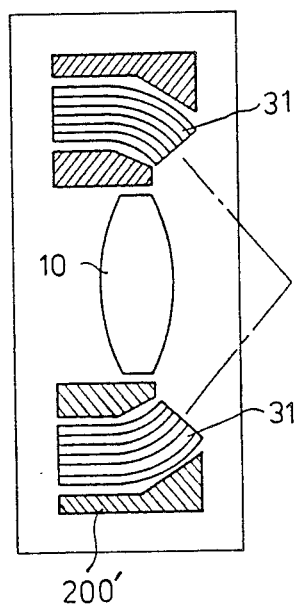
FIG. 28 is a sectional view showing diffracted lights guiding means of a third embodiment.

Apart from the above-mentioned embodiment 1 and embodiment 2 wherein prisms 24 or prisms 30, 30 are used besides the objective lens 10 in order to guide the reflected light with retaining coherence, single mode optical fiber may be used in place thereof. FIG. 28 is a sectional view showing such embodiment, wherein on both sides of the objective lens 10, a pair of bunches of single mode optical fibers 31, 31 to guide the reflected diffracted light with retaining the coherence are provided. These are encapsulated in an integral casing 200' and used in place of the optical unit 200 of the objective lens of FIG. 17. Other parts and operation are the same as the embodiment 2.

Embodiment 4

Figure 1:
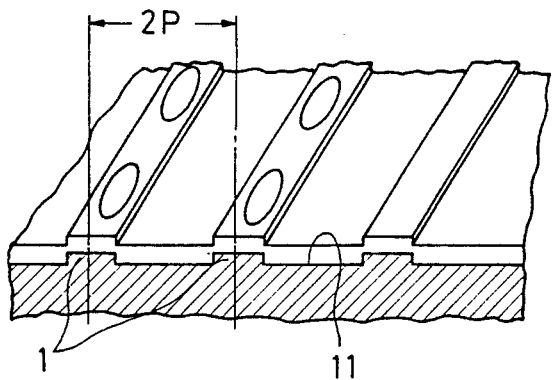
FIG. 1 is the perspective view showing the surface part of the U-shaped groove type optical disk.
Figure 2:
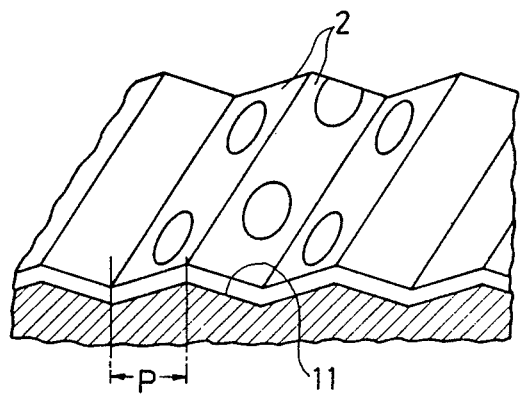
FIG. 2 is the perspective view showing the surface part of the V-shaped groove type optical disk.
Figure 3:
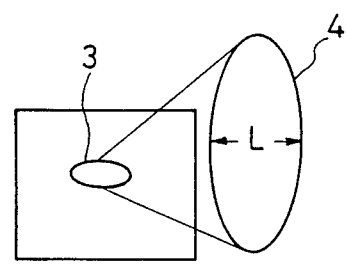
FIG. 3 is the schematic view illustrating light emitting pattern of the semiconductor laser.
Figure 29:
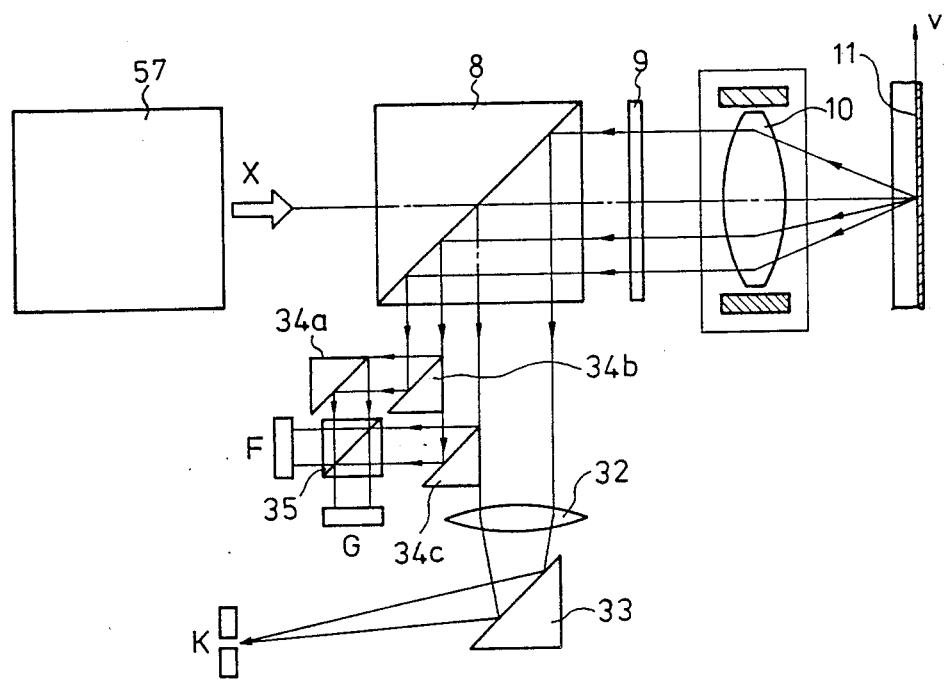
FIG. 29 is a sectional view showing optical system of the signal reproduction apparatus of a fourth embodiment.
Figure 30:
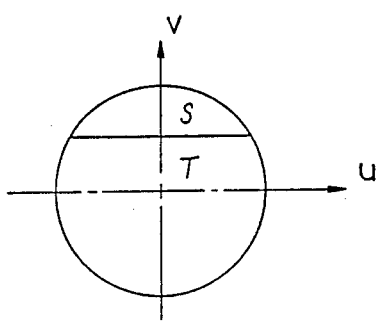
FIG. 30 is a front view illustrating interference region of exit pupil of the objective lens 10 of the fourth embodiment.

FIG. 29 shows a fourth embodiment. In this embodiment, differently from the first to third embodiments, different diffracted lights within the same objective lens 10 are each other interfered. For the laser light generation part, the same apparatus 57 as shown in FIG. 1 is used, and therefore the detail of the laser light generation part 57 is omitted. Corresponding components and parts to the first embodiment of FIG. 17 are designated by the corresponding numerals thereto and detailed explanation is omitted. The light reflected from the recorded surface 11 of the optical disk is guided through one objective lens 10, a quarter wavelength plate 9, a polarized light beam splitter 8 and an optical system having mirrors 34a, 34b, 34c, half mirror 35, a convergence lens 32, a mirror 33 and three photo-detectors F, G and K. Upper half part of the reflected light from the objective lens 10 of FIG. 29 is reflected by the beam splitter to the convergence lens 32, and projected on the photo-detector K, the output of which is used to make known focus controlling. The output of the photo-detector K may be used for signal reproduction in accordance with the conventional method. Lower half part of the reflected light from the objective lens 10 of FIG. 29 is reflected by the lower part of the beam splitter 8 and incident to the mirrors 34b and 34c. The light reflected by the mirrors 34b and 34c are made to interfere on the half mirror 35 and the interference lights are detected by the photo-detectors F and G (dispositions of the photo-detectors are the same as described with reference to FIGS. 18 and 19), and the outputs thereof are used both for tracking controlling and signal reproduction in accordance with the principle of the present invention.

Figure 14:
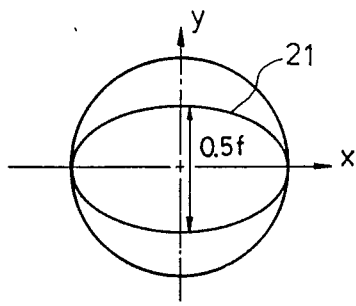
FIG. 14 is the front view illustrating shape of the incident light beam for high transmission efficiency.
Figure 15:
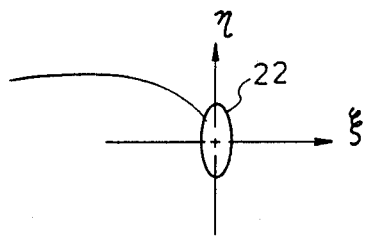
FIG. 15 is the front view illustrating shape of the laser spot at the high transmission efficiency.
Figure 16:
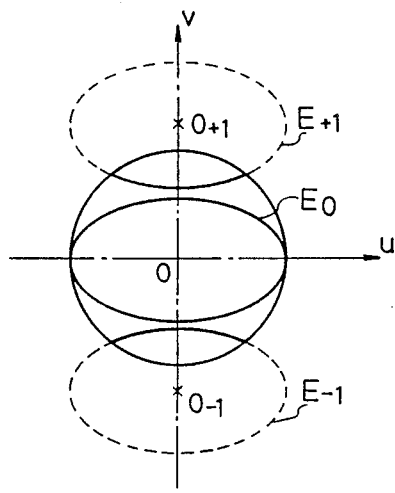
FIG. 16 is the front view illustrating disposition of the diffracted lights on the exit pupil face of the objective lens at the high transmission efficiency.
Figure 31:
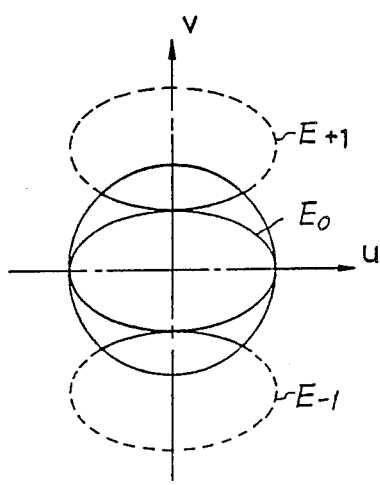
FIG. 31 is a front view illustrating disposition of diffracted lights on exit pupil of the objective lens 10 of the fourth embodiment.
Figure 32:
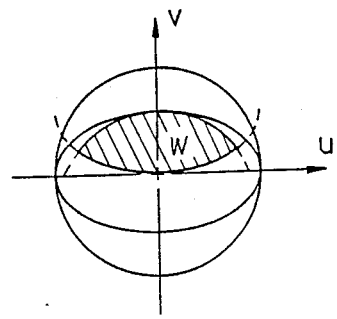
FIG. 32 is a front view illustrating an induced interference region W of the fourth embodiment.

In order to collect high laser power on the recorded surface 11 of the optical disk, the laser light beam is focussed as shown by FIG. 14 as elliptic laser light beam spot, thereby to achieve high transmission efficiency of the optical system. Provided that the incident light has uniform distribution (light wave is $A_1$) only within the region of the elliptic circle 21 of FIG. 15, then assuming that the beam size is expanded 2 times in FIG. 4, the light intensity becomes 2 times and a relation of $A_1 = \sqrt{2} A_0$ holds. Now, consideration is made on the optical disk having the U-shaped groove and bit density of the fourth embodiment. When the bit length is $\lambda$ (i.e., $q=2\lambda$), the diffracted lights on the exit pupil of the objective lens 10 do not overlap each other as shown in FIG. 31. However, in this embodiment 4, the diffracted light $E_0$ and $E_1$ can be each other interfered, as shown in FIG. 32, wherein the interference region W (shown by hatching) has an area of about 0.15 $f^2$. The light wave $E_W$ in this region W and the light intensity $I_W$ are given similarly to the case of equations (10) and (11) as follows:

$$E_W = \left\{ \frac{r_1 + r_2}{2} + \sqrt{2} \ \frac{r_2 - r_1}{\pi} \exp\left(-2\pi i \frac{Vt}{q}\right) \right\} A_0 \quad (18)$$

$$I_W = \frac{\sqrt{2}}{\pi} \Delta R \cos\left(2\pi \frac{Vt}{q}\right) |A_0|^2. \quad (19)$$

Figure 33:
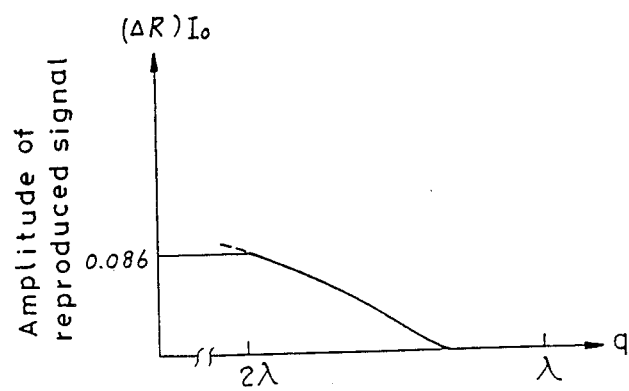
FIG. 33 is a graph showing frequency characteristic of amplitude of reproduced signal obtained by induced interference in the fourth embodiment.
Figure 34:
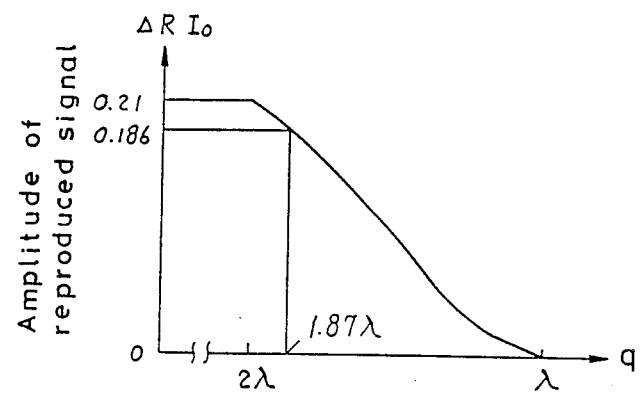
FIG. 34 is a graph showing frequency characteristic of amplitude of reproduced signal obtained in the fourth embodiment.

The light wave of the reproduced signal is obtainable as $0.086(\Delta R)I_0$. When the recorded bit length is shorter than the laser light wavelength $\lambda$, the center of diffracted light $E_1$ depart from the center of the diffracted light $E_0$, and the area of the region W decreases and the amplitude of the reproduced signal is also decreased. When the recorded bit length becomes shorter than $0.63\lambda$, the 1st diffracted light can not be returned to the objective lens and the reproduction becomes impossible. FIG. 33 shows the frequency characteristic of the amplitude of the reproduced signal in the region W of FIG. 32. The frequency characteristic of the amplitude of the reproduced signal in accordance with this embodiment 4 is given as a sum of half value of that of FIG. 11 and that of FIG. 33, and the sum is shown in FIG. 34.

According to this embodiment, the bit density is not much different from the conventional method, but it is possible to raise the laser power on the recorded surface 11 of the optical disk, thereby enabling to increase rotation speed of the optical disk. In the conventional method, the case in which C/N ratio of over 50 dB is obtainable is for the case when the amplitude of the reproduced signal is $0.186(\Delta R)I_0$ (shown in FIG. 11), and this corresponds to a case of $q=1.87\lambda$ in this embodiment 4. When the disk is rotated at 3600 rpm, with a radial position of 75 mm for the recorded signal, such a high frequency signal as 18 MHz can be reproduced with good quality.

Figure 35:
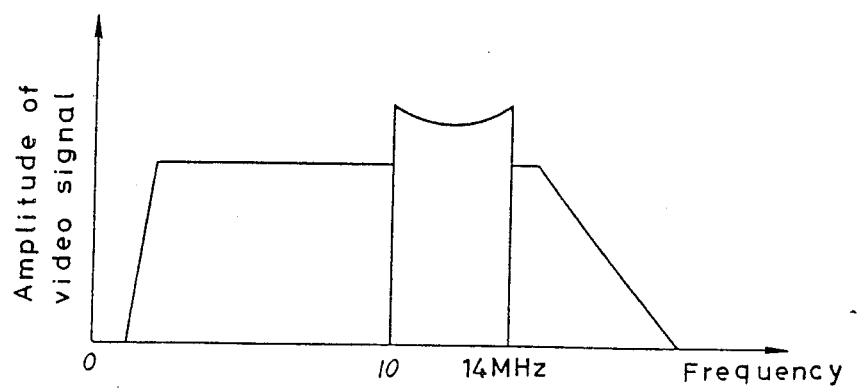
FIG. 35 is a frequency diagram illustrating video signal amplitude of a high quality television system named MUSE system.

The aforementioned MUSE system high quality television signal can be represented by showing a spectral distribution of signal shown in FIG. 35, and such high quality TV signal can be recorded and reproduced for a time length of about 10 minutes by using an optical disk having track pitch of 1.67 $\mu$m rotated at about 23 m/sec and having a diameter of 20 cm (radius of recording zone is 5-10 cm).

Recording and reproducing of signal from the V-shaped groove type optical disk can be made in the quite similar manner with the same bit density. As a summary, according to the present invention, by means of the induced coerosive interference between the 0th diffracted light and +1st or −1st diffracted lights, high frequency signal can be recorded and reproduced.

While the invention has been described in connection with what is presently considered to be the most practical and preferred embodiments, it is to be understood that the invention is not limited to the disclosed embodiment but, on the contrary is intended to cover various modification and equivalent arrangements included within the spirit and scope of the appended claims.

What is claimed is:

1. A method for reproducing a signal recorded in optical form comprising the steps of:
    irradiating a laser beam focused on a recorded surface of an optical disk through an objective lens,
    guiding a first part of a reflected light from said recorded surface through said objective lens, and guiding a second part of said reflected light from said recorded surface through a sub-optical path being outward from said objective lens,
    making interference between said first part of said reflected light and said second part of said reflected light to produce at least one interference light, and
    photo-detecting said interference light to reproduce said signal recorded in optical form.

2. A method for reproducing a signal recorded in optical form in accordance with claim 1, wherein
    said sub-optical path passes through a light convergence lens means and prism means.

3. A method for reproducing a signal recorded in optical form in accordance with claim 1, wherein
    said sub-optical path passes through a single mode optical fiber means.

4. An apparatus for reproducing a signal recorded in optical form comprising:
    means for irradiating a laser beam focused on a recorded surface of an optical disk through an objective lens,
    means for guiding a first part of a reflected light from said recorded surface through said objective lens, and guiding a second part of said reflected light from said recorded surface through a sub-optical path being outward from said objective lens,
    means for making interference between said first part of said reflected light and second part of said reflected light to produce at least one interference light, and
    means for photo-detecting said interference light to reproduce a signal recorded in optical form.

5. An apparatus for reproducing a signal recorded in optical form in accordance with claim 4, wherein
said sub-optical path comprises light convergence lens means and prism means.

6. An apparatus for reproducing a signal recorded in optical form in accordance with claim 4, wherein
said sub-optical path comprises single mode optical fiber means.

* * * * *